United States Patent [19]

McNamara et al.

[11] 4,034,620

[45] July 12, 1977

[54] GEAR RETAINER

[75] Inventors: Thomas V. McNamara; Elmer A. Richards, both of Kalamazoo, Mich.

[73] Assignee: Eaton Corporation, Cleveland, Ohio

[21] Appl. No.: 687,954

[22] Filed: May 19, 1976

[51] Int. Cl.² .................... F16H 57/00; F16H 3/08
[52] U.S. Cl. .................................. 74/410; 74/325
[58] Field of Search ........... 74/331, 325, 333, 339, 74/410; 192/109 R, 110 R, 110 B

[56] References Cited

U.S. PATENT DOCUMENTS

| | | | |
|---|---|---|---|
| 2,397,905 | 4/1946 | Acton et al. | 192/109 R X |
| 2,676,684 | 4/1954 | Armantrout | 192/109 R X |
| 3,293,931 | 12/1966 | Beattie | 74/325 |
| 3,425,290 | 2/1969 | Perkins | 74/410 X |
| 3,611,823 | 10/1971 | Richards et al. | 74/410 X |
| 3,885,446 | 5/1975 | Pengilly | 74/331 |
| 3,894,621 | 7/1975 | Quick | 192/109 R |

Primary Examiner—Samuel Scott
Assistant Examiner—Lance W. Chandler
Attorney, Agent, or Firm—Teagno & Toddy

[57] ABSTRACT

Improved mainshaft gear retainer means for a twin countershaft transmission having floating mainshaft gears positioned close together in groups of two and clutchable to a mainshaft one at a time by positive clutches which each have splines mateable with splines defined by each gear. The improved mainshaft gear retainer means prevents axial movement of two closely positioned gears and includes a snap ring axially interconnecting the gears, a thrust ring interposed between the axially interconnected gears, and a snap ring carried by each axially interconnected gear.

11 Claims, 3 Drawing Figures

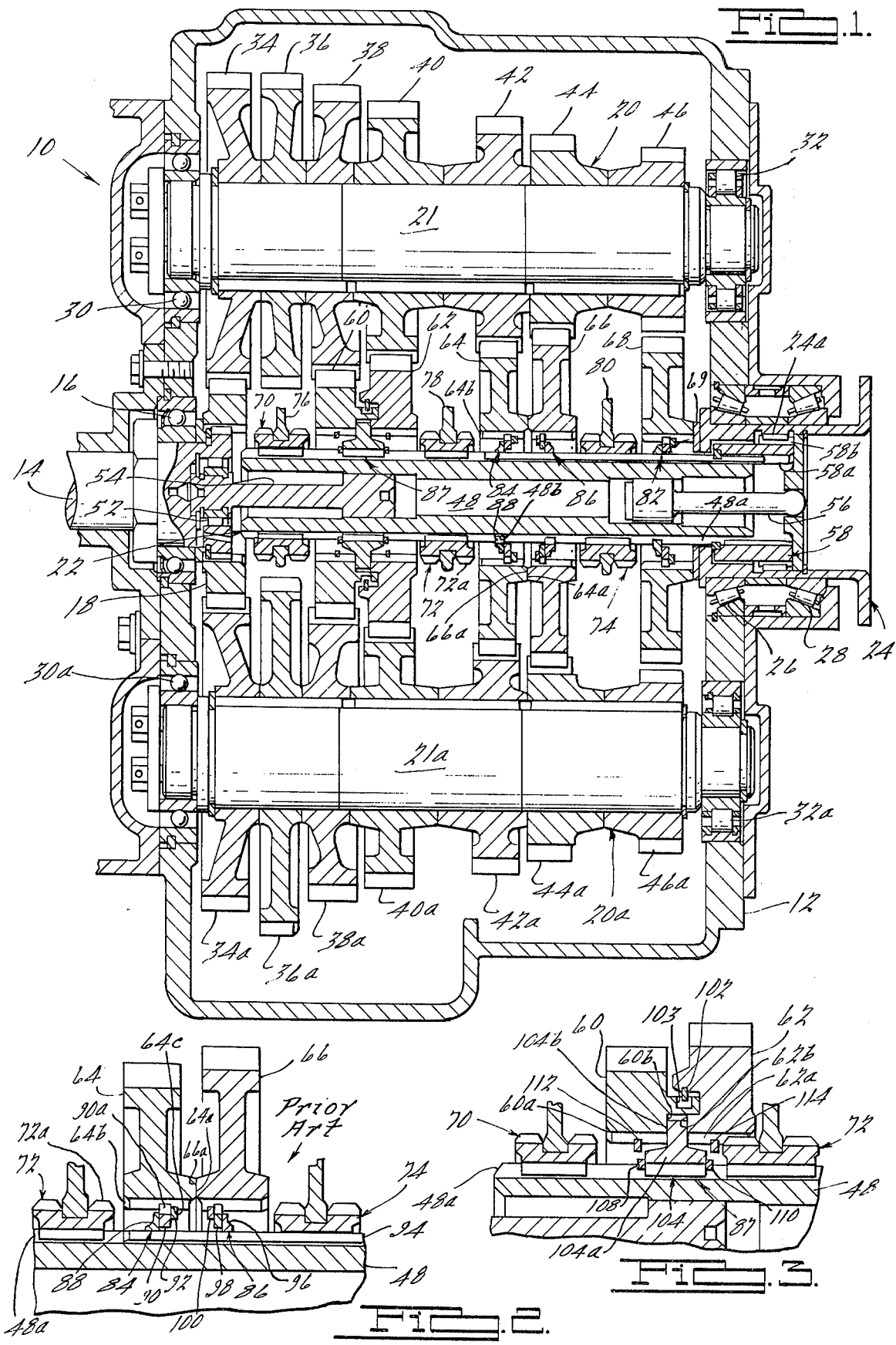

4,034,620

GEAR RETAINER

BACKGROUND OF THE INVENTION

1. Field of the Invention

The invention relates to gear retainer means and more specifically to mainshaft gear retainer means for a transmission having a plurality of countershafts.

2. Description of the Prior Art

Gear retainer means for closely spaced and floating mainshaft gears are well known. The prior art retainer means associated with one of the closely spaced gears prevents axial movement of that gear in one direction; movement of that gear in the other direction is prevented by the other gear and its associated retainer and vice versa. When the forces tending to move one of the gears are reacted by the other gear and its associated retainer, the forces must cross retainer surfaces rotating at different speeds; this makes the retainer subject to wear and failure.

SUMMARY OF THE INVENTION

An object of this invention is to provide a durable gear retainer means for a floating gear.

According to a feature of this invention, the gear retainer means includes a thrust ring disposed between two closely positioned gears on a mainshaft of a transmission having a plurality of countershafts with gears supporting and driving the two mainshaft gears at different speeds. The thrust ring is fixed to the mainshaft, allows radial movement of the mainshaft gears, and provides a reaction surface rotating at the speed of the mainshaft gear that is clutched to the mainshaft.

BRIEF DESCRIPTION OF THE DRAWINGS

The preferred embodiment of the invention is shown in the accompanying drawing in which:

FIG. 1 is a sectional view of a twin countershaft transmission;

FIG. 2 is a detailed view of prior art gear retainer means shown in FIG. 1; and

FIG. 3 is a detailed view of a gear retainer means of the present invention and also shown in FIG. 1.

DETAILED DESCRIPTION OF THE DRAWINGS

Referring now to FIG. 1, therein is shown a twin countershaft transmission 10 having a floating mainshaft. This specific type of transmission is illustrated herein only to provide an environment for the present invention. Specific details of the transmission may be found in U. S. Pat. Nos. 3,237,472 and 3,238,613. U. S. Pat. No. 3,237,472 discloses the transmission substantially as shown herein. U. S. Pat. No. 3,238,613 discloses the transmission as a main unit in combination with an auxiliary unit.

Transmission 10 includes a housing 12, an input shaft 14 supported by a bearing 16, an input gear 18 driven by the input shaft, a pair of countershaft assemblies 20 and 20a, a floating mainshaft assembly 22 and an output shaft 24 supported by bearings 26 and 28.

The countershaft assembly 20 includes a countershaft 21 which is rotatably supported at its left and right ends by bearings 30 and 32. The bearings allow free rotation of the shaft and prevent axial and radial movement. Countershaft assembly 20a includes a countershaft 21a supported in the same manner by bearings 30a and 32a. Each countershaft is provided with one of a plurality of pairs of gears of identical size and function; these gears are each fixed to rotate with their respective countershaft. Gears 34 and 34a are in mesh with input gear 18, whereby the countershafts rotate at the same speed. Gear pairs 36–36a are power take-off gears. Gear pairs 38–38a, 40–40a, 42–42a, and 44–44a are ratio gears. Gear pairs 46–46a are reverse gears.

The floating main shaft assembly 22 includes a hollow main shaft 48 having external splines 48a which extend the full length of the shaft. The left end of shaft 48 is supported for rotational and radial movement relative to input shaft 14 by a bearing 52 and a spring 54, respectively. The right end of shaft 48 is resiliently supported on the output shaft 24 by a second spring 56 and is loosely connected to the output shaft by a sleeve 58. Sleeve 58 has internal splines 58a which mesh with splines 48a and external splines 58b which mesh with internal splines 24a in the output shaft. Further details of the mainshaft mounting arrangement may be obtained from U.S. Pat. No. 3,237,472.

Five mainshaft drive gears 60, 62, 64, 66 and 68 encircle mainshaft 48. Adjacent gears 60, 62, and 64, 66 are positioned close together to reduce the length of the transmission. The axially facing hubs 64a and 66a on gears 64 and 66 abut each other and are ground smooth to reduce friction therebetween. The input gear 18 and the mainshaft gears are selectively clutchable to the mainshaft, one at a time, by positive clutches 70, 72 and 74 which are slideably connected to the mainshaft by internal splines. Each clutch includes jaws or external splines, such as splines 72a on clutch 72, which mate with jaws or internal splines, such as splines 64b defined by gear 64. Splines 64b and 72a are substantially parallel to the mainshaft. The sliding clutches are moved into and out of engagement one at a time by partially shown shaft forks 76, 78 and 80. The construction and manner of operation of the shift forks is well known.

The mainshaft drive gears, though encircling mainshaft 48, are not radially supported thereon. Each gear is radially supported by the pair of countershaft gears it is in mesh with, i. e., each of the mainshaft drive gears is free to float radially with respect to the mainshaft. The feature of floating the mainshaft and its gears provides a nearly equal torque split between the countershaft gears. This feature, which is well known, has greatly improved the wear life of the countershaft transmissions.

The mainshaft drive gears, when clutched to the mainshaft and when under load, are quite often acted on by substantial forces acting along the direction of the mainshaft axis. The precise reasons or causes for the axial forces are not fully understood and the direction of the forces along the axis is not totally predictable. The forces often manifest between the engaged splines of a gear and its clutch. When the forces appear between the splines, they often act in a direction tending to disengage the clutch from the gear splines. However, sometimes the forces act in a direction tending to further engage the clutch with the gear splines. Regardless of where the forces manifest, they tend to move the gear along the axis of the mainshaft; hence, gear retainers are needed to react the forces and prevent such movement. However, if the forces are reacted by gear and retainer surfaces rotating at a different speed, the forces cause wear and sometimes premature failure of the surfaces.

Mainshaft drive gears 64, 66 and 68 are shown retained against axial movement by prior art gear retainers 82, 84, and 86, which are shown for example purposes. Mainshaft drive gears 60 and 62 are shown retained against axial movement by a retainer 87 of the present invention.

Looking first at FIG. 2, therein is shown in detail prior art retainers 84 and 86. Retainer 84 includes a thrust washer 88 disposed in a circumferential groove 48b cut into external splines 48a (see the lower portion of the thrust washer 88 in FIG. 1), the spacer ring 90 having external teeth 90a in loose mesh with internal splines 64a and having an inside diameter larger than the major diameter of mainshaft 48, and a snap ring 92 retained in a circumferential groove 64c cut into splines 64b. Thrust washer 88 includes internal splines which allow the washer to be slid along the shaft to groove 48b. The thrust washer is retained against axial movement by the shoulders of groove 48jb by rotating the washer a distance equal to one spline. The washer is then locked against rotation relative to the mainshaft by a key 94.

Retainer 86 is a mirror image of retainer 84 and includes a thrust washer 96, a spacer ring 98, and a snap ring 100. Thrust washer 96 is also locked against rotation by key 94.

Retainer 84 prevents axial movement of gear 64 only in the leftward direction; gear 66 and retainer 86 prevent axial movement of gear 64 in the rightward direction. Retainer 86 prevents axial movement of gear 66 only in the rightward direction; gear 64 and retainer 84 prevent axial movement of gear 66 in the leftward direction.

Retainer 82 is identical to retainer 84. Rightward movement of gear 68 is prevented by a thrust plate 69 (see FIG. 1).

The features of placing two mainshaft gears close together to reduce transmission length and floating the mainshaft gears to equalize the torque split of the countershaft gear pairs have been recognized for years as significant advancements in the transmission art. However, these advancements have, at the same time, complicated the design of durable gear retainers for preventing axial movement of the closely spaced and floating mainshaft gears, since the gear retainers are confined to a relatively small space and at times must react against relatively high forces tending to move the gears axially. The prior art gear retainers, such as the type exemplified by retainers 84 and 86, have been subject to the problem of wear, overheating, and premature failure due to high stresses acting on surfaces rotating at different speeds. The problem can be particularly troublesome in countershaft transmissions wherein the mainshaft is fixed against radial movement and only the mainshaft gears float. For example, prior art retainer 84 reacts forces acting on gear 64 in only one direction and requires the presence of gear 66 and retainer 86 to react forces in the other direction. The forces in the other direction are transferred across abutting surfaces 64a and 66a of the two gears and then across the surfaces of thrust ring 96 and spacer ring 98 of retainer 86. The surfaces of the thrust and spacer rings 96 and 98 rotate at different speeds when gear 64 is clutched to the mainshaft. Further, these surfaces are relatively small and are therefore subject to high surface stresses.

Looking now at FIG. 3, therein is shown in detail gears 60 and 62 in combination with gear retainer means 87. Retainer means 87 includes snap ring 102 carried by gear 62 and loosely received in an annular groove in gear 60, a thrust ring 104, snap rings 108 and 110 disposed in circumferential grooves cut into splines 48a, and snap rings 112 and 114 cut into splines 60a and 62a of gears 60 and 62. Thrust ring 104 includes a hub portion 104a splined to mainshaft 48 and retained against axial movement relative to the mainshaft by snap rings 108 and 110 and an annular flange portion 104b extending radially outward between gears 60 and 62. Flange portion 104b includes axial end surfaces which abut axially facing end surfaces 60b and 62b defined by the gears 60 and 62.

Thrust ring 104 allows free radial movement of gears 60 and 62 relative to the mainshaft. As an important feature of the invention, ring 104 always rotates at mainshaft speed and always at the speed of the gear clutched to the mainshaft. Therefore, forces tending to move the clutched gear toward the unclutched gear are reacted by surfaces rotating at the same speed.

Snap rings 112 and 114 are reaction means or stops which each rotate with their respective gear and clutch, when the respective clutch is engaged. The snap rings abut their respective clutch, when same is engaged, and therefore limit the amount of sliding engagement of their respective clutch. Snap rings 112 and 114 may be carried by their respective gear, as shown, or carried by their associated clutch. As a further important feature of the invention, the rings react against forces tending to further engage their respective clutch or move the clutched gear away from the unclutched gear. Hence, thrust ring 104 and snap rings 112 and 114 combine to react all axial forces tending to move gears 60 and 62, and do so with surfaces and parts rotating at the same speed.

Snap ring 102 and groove 103 axially interconnect gears 60 and 62, allow free relative rotation between the gears, and cooperate with thrust means 104 to loosely position or limit movement of the gears in the axial direction relative to the thrust means and the mainshaft. Snap ring 102 and groove 103 are not intended to react against the relatively high forces tending to axially move a clutched one of the gears 60 and 62. Hence, groove 103 is preferably made wide enough to allow a small amount of free axial play between the shoulders of the groove and snap ring 102. For example, relatively high forces tending to axially move gear 62 away from gear 60 will, in all likelihood, cause a slight rightward movement of gear 62 away from thrust ring 104 before the forces are arrested by snap ring 114 and clutch 62. The free play, between the shoulders of groove 103 and snap ring 102, allows this slight movement and thereby prevents transferal of the forces across surfaces rotating at different speeds.

Thrust ring 104 may be modified to be substantially smaller in the axial direction than prior art retainers 84 and 86 by removing part of hub portion 104a. This modification is possible since the thrust ring is a single part and since it need not have the capacity to transmit forces across surfaces rotating at a different speed. The thrust ring is disposed between gears 60 and 62 and when so modified it does not occupy space that is better used for clutching the gears to the mainshaft. For example, the space may be used to provide added length to the clutch splines and/or to more centrally position the clutch splines axially in the gear splines. Added length strengthens the clutch. Added length and/or more centrally positioned clutch splines tend to reduce cocking tendencies of the clutch and therefore tend to reduce the magnitude of clutch engaging and disengaging forces.

The preferred embodiment of the invention has been disclosed for illustrative purposes. Variations and modifications of the preferred embodiment are believed to be within the spirit of the invention. The following claims are intended to cover the inventive portion of the preferred embodiment and variations and modifications within the spirit of the invention.

What is claimed is:

1. In a transmission of the type having a mainshaft, at least two floating mainshaft gears encircling said mainshaft and axially positioned close together, a plurality of countershafts having countershaft gears supporting said mainshaft gears and driving said mainshaft gears at different rotative speeds, and clutch means selectively operative to clutch said mainshaft gears to said mainshaft one at a time, the improvement comprising:

thrust means fixed to said mainshaft and having thrust surfaces disposed between axially facing thrust surfaces defined by said mainshaft gears, said thrust means allowing radial movement of said mainshaft gears relative to said mainshaft and preventing axial movement of said mainshaft gears toward each other, whereby forces tending to move a clutched one of said mainshaft gears toward the unclutched mainshaft gear are reacted to the mainshaft through surfaces rotating at the same speed.

2. The improvement of claim 1, further comprising:
means axially interconnecting said mainshaft gear and allowing relative rotation therebetween and operative to limit axial movement of the unclutched ones of said mainshaft gears relative to said thrust means.

3. In the transmission of claim 1, wherein said clutch means includes at least two jaw clutches slideably splined to said mainshaft and disposed on oppositely facing ends of said mainshaft gears and selectively engageable respectively with mating jaws defined by said mainshaft gears, the improvement further comprising:
means axially interconnecting said mainshaft gears and allowing relative rotation therebetween and operative to limit axial movement of the unclutched ones of said mainshaft gears relative to said thrust means.

4. In the transmission of claim 1, wherein said clutch means includes at least two clutches disposed on oppositely facing ends of said mainshaft gears, said clutches each slideably splined to said mainshaft and each having clutching splines engageable with mating clutch splines defined by said mainshaft gears, and wherein said improvement further comprises:
stop means associated with each mainshaft gear and its respective clutch and rotating at the same speed as the clutched gear and its engaged clutch, said stop means operative when the mainshaft gear and its respective clutch is engaged to react against axial forces tending to move the clutched gear away from the unclutched gear, whereby forces tending to move a clutched gear away from the unclutched gear are reacted by means rotating at the same speed.

5. The improvement of claim 4, further comprising:
means axially interconnecting said mainshaft gears and allowing relative rotation therebetween and operative to limit axial movement of the unclutched ones of said mainshaft gears relative to said thrust means.

6. In a transmission of the type having a mainshaft, at least two floating mainshaft gears encircling said mainshaft and axially positioned close together, a plurality of counter-shafts having countershaft gears supporting said mainshaft gears and driving said mainshaft gears at different rotative speeds, and clutch means selectively operative to clutch said mainshaft gears to said mainshaft one at a time, the improvement comprising:

thrust means fixed to said mainshaft and having thrust surfaces disposed between axially facing thrust surfaces defined by said mainshaft gears, said thrust means allowing radial movement of said mainshaft gears relative to said mainshaft and preventing axial movement of said mainshaft gears toward each other, whereby forces tending to move a clutched one of said mainshaft gears toward the unclutched mainshaft gear are reached to the mainshaft through surfaces rotating at the same speed, and reaction means rotating at the same speed as said clutched gear and the clutch means clutching said clutched gear to said mainshaft for preventing axial movement of said clutch gear away from said unclutched gear, whereby forces tending to move said clutched gear away from said unclutched gear are reacted by means rotating at the same speed.

7. The improvement of claim 6, further comprising:
means axially interconnecting said mainshaft gears and allowing relative rotation therebetween and operative to limit axial movement of the unclutched ones of said mainshaft gears relative to said thrust means.

8. In a transmission of the type having a mainshaft, at least two floating mainshaft gears encircling said mainshaft and axially positioned close together, a plurality of countershafts having countershaft gears supporting said mainshaft gears and driving said mainshaft gears at different rotative speeds, at least two jaw clutches slideably splined to said mainshaft and disposed on oppositely facing ends of said mainshaft gears, said clutches selectively engageable, respectively, with mating jaws defined by said mainshaft gears, the improvement comprising:
thrust means fixed to said mainshaft and hafing thrust surfaces disposed between axially facing thrust surfaces defined by said mainshaft gears, said thrust means allowing radial movement of said mainshaft gears relative to said mainshaft and preventing axial movement of said mainshaft gears toward each other, whereby forces tending to move a clutched one of said mainshaft gears toward the unclutched mainshaft gear are reacted to the mainshaft through surfaces rotating at the same speed.

9. The improvement of claim 8, further comprising:
means axially interconnecting said mainshaft gears and allowing relative rotation therebetween and operative to limit axial movement of the unclutched ones of said mainshaft gears relative to said thrust means.

10. In the transmission of claim 8, wherein the jaws of said clutches are splines engageable with mating splines defined by said mainshaft gears, and wherein said improvement further comprises:
stop means associated with each mainshaft gear and its respective clutch and rotating at the same speed as the clutched gear and its engaged clutch, said stop means operative when a mainshaft gear and its respective clutch is engaged to react against axial forces lending to move the clutched gear away from the unclutched gear, whereby forces tending to move a clutch gear away from the unclutched gear are reacted by means rotating at the same speed.

11. The improvement of claim 10, further comprising:
means axially interconnecting said mainshaft gears and allowing relative rotation therebetween and operative to limit axial movement of the unclutched ones of said mainshaft gears relative to said thrust means.

* * * * *

UNITED STATES PATENT AND TRADEMARK OFFICE
CERTIFICATE OF CORRECTION

PATENT NO. : 4,034,620
DATED : July 12, 1977
INVENTOR(S) : Thomas V. McNamara; Elmer A. Richards It is certified that error appears in the above-identified patent and that said Letters Patent are hereby corrected as shown below:

Col. 2, line 35:   "shaft" should read "shift".

Col. 3, line 9:    "the" before "spacer" should read ---a---.

line 11:   "64a" should read "64b".

line 17:   "48jb" should read "48b".

Col. 6, line 42:   "hafing" should read "having".

Signed and Sealed this

Twenty-seventh Day of September 1977

[SEAL]

Attest:

RUTH C. MASON
Attesting Officer

LUTRELLE F. PARKER
Acting Commissioner of Patents and Trademarks